United States Patent
Iuga et al.

(10) Patent No.: US 12,398,788 B2
(45) Date of Patent: Aug. 26, 2025

(54) ELECTRIC LINEAR ACTUATOR WITH ANTI-BACKDRIVE MECHANISM

(71) Applicant: Brunswick Corporation, Mettawa, IL (US)

(72) Inventors: Ioan Iuga, Caledonia, MI (US); Perin E. Truax, Caledonia, MI (US); Michael J. Boks, Grand Rapids, MI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 18/451,983

(22) Filed: Aug. 18, 2023

(65) Prior Publication Data
US 2025/0060026 A1    Feb. 20, 2025

(51) Int. Cl.
| | |
|---|---|
| *F16H 25/24* | (2006.01) |
| *B63B 1/30* | (2006.01) |
| *F16H 25/20* | (2006.01) |
| *H02K 7/06* | (2006.01) |

(52) U.S. Cl.
CPC .............. *F16H 25/24* (2013.01); *B63B 1/30* (2013.01); *F16H 25/20* (2013.01); *H02K 7/06* (2013.01); *F16H 2025/2031* (2013.01); *F16H 2025/2081* (2013.01)

(58) Field of Classification Search
CPC ......... F16H 25/2021; F16H 2025/2071; F16H 25/2454
See application file for complete search history.

(56) References Cited

U.S. PATENT DOCUMENTS

| | | |
|---|---|---|
| 6,158,295 A | 12/2000 | Nielsen |
| 8,485,054 B2 | 7/2013 | Tateishi et al. |
| 8,692,428 B2 | 4/2014 | Miyairi et al. |
| 8,875,592 B2 | 11/2014 | Bastholm et al. |

(Continued)

FOREIGN PATENT DOCUMENTS

| | | | |
|---|---|---|---|
| EP | 3515252 A0 | 7/2019 | |
| JP | H09-224348 A | * 8/1997 | |
| WO | WO-2018198526 A1 | * 11/2018 | ......... F16H 25/2454 |

OTHER PUBLICATIONS

Deuel et al., "Electric Linear Actuator with Position Sensing", U.S. Appl. No. 17/716,542, filed Apr. 8, 2022 (drawings, specification, and claims only).

(Continued)

*Primary Examiner* — Gregory Robert Weber
(74) *Attorney, Agent, or Firm* — Andrus Intellectual Property Law, LLP (57) ABSTRACT

An electric linear actuator includes a housing extending along a longitudinal axis, the housing configured to be coupled to a first component. A spindle is provided in the housing and extends along the longitudinal axis from a proximal end to a distal end. A motor is coupled to the proximal end of the spindle and is configured to rotate the spindle. A spindle nut is received on the spindle and is movable with respect to the housing along the longitudinal axis in response to rotation of the spindle. The spindle nut is configured to be coupled to a second component. A one-way bearing prevents back-drive of the motor when an external load is applied to the second component while the motor is not provided with electrical power.

20 Claims, 6 Drawing Sheets

(56) References Cited

U.S. PATENT DOCUMENTS

| | | |
|---|---|---|
| 10,000,267 B1 * | 6/2018 | Anschuetz ............... G05D 3/00 |
| 10,153,678 B2 | 12/2018 | Sorensen et al. |
| 11,183,900 B2 | 11/2021 | Oberndorfer et al. |
| 2017/0073056 A1 | 3/2017 | Ritger et al. |
| 2022/0041251 A1 | 2/2022 | Baros |
| 2022/0243793 A1 * | 8/2022 | Hu ........................... A47B 9/04 |

OTHER PUBLICATIONS

Extended European Search Report in EP Application No. 24194879.3, dated Feb. 4, 2025, 10 pages.

* cited by examiner

ELECTRIC LINEAR ACTUATOR WITH ANTI-BACKDRIVE MECHANISM

FIELD

The present disclosure relates to electric linear actuators, such as for example actuators for trim tabs on boats.

BACKGROUND

U.S. patent application Ser. No. 17/716,542, filed Apr. 8, 2022, which is hereby incorporated by reference herein, discloses an electric linear actuator having a housing extending along a longitudinal axis. A spindle is provided in the housing and extends along the longitudinal axis. A rod is coaxially coupled to the spindle and extends from a proximal end located in the housing to a distal end located outside the housing. The rod is movable along the longitudinal axis in response to rotation of the spindle. A circuit board is located in the housing adjacent the proximal end of the rod. The circuit board includes a linear inductive sensor having a linear axis oriented parallel to the longitudinal axis. The linear inductive sensor senses an actual position of the proximal end of the rod.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, an electric linear actuator comprises a housing extending along a longitudinal axis. A spindle is provided in the housing and extends along the longitudinal axis from a proximal end to a distal end. A motor is coupled to the proximal end of the spindle and configured to rotate the spindle. A rod is coaxially coupled to the spindle and movable with respect to the housing along the longitudinal axis in response to rotation of the spindle. A one-way bearing is configured to prevent back-drive of the motor when the spindle is subject to an external load via the rod.

According to some aspects, the electric linear actuator further comprises a thrust bearing provided coaxially on the spindle. The thrust bearing is located between the proximal end of the spindle and the rod.

According to some aspects, the electric linear actuator further comprises a first bearing surface located on a proximal side of the thrust bearing and a second bearing surface located on a distal side of the thrust bearing.

According to some aspects, one of the first and second bearing surfaces is provided on a thrust race that is provided coaxially on the spindle. The thrust race also serves as an inner race for the one-way bearing.

According to some aspects, the other of the first and second bearing surfaces is provided on a thrust washer.

According to some aspects, the spindle is configured to rotate within the thrust race as the motor rotates the spindle in a direction that retracts the rod into the housing.

According to some aspects, the thrust race comprises a hollow cylindrical portion serving as the inner race for the one-way bearing and a flange extending radially outwardly from the cylindrical portion, the flange comprising the one of the first and second bearing surfaces.

According to some aspects, the one-way bearing is located adjacent the proximal end of the spindle. According to some aspects, the one-way bearing is located between the proximal end of the spindle and the thrust bearing.

According to some aspects, the one-way bearing is a roller bearing having rollers with axes of rotation parallel to the longitudinal axis.

According to another example of the present disclosure, an electric linear actuator comprises a housing extending along a longitudinal axis, the housing configured to be coupled to a first component. A spindle is provided in the housing and extends along the longitudinal axis from a proximal end to a distal end. A motor is coupled to the proximal end of the spindle and is configured to rotate the spindle. A spindle nut is received on the spindle and is movable with respect to the housing along the longitudinal axis in response to rotation of the spindle. The spindle nut is configured to be coupled to a second component. A one-way bearing is configured to prevent back-drive of the motor when an external load is applied to the second component while the motor is not provided with electrical power.

According to some aspects, the electric linear actuator further comprises a thrust bearing provided coaxially on the spindle.

According to some aspects, the electric linear actuator further comprises a thrust race provided coaxially on the spindle. The thrust race comprises both a radially oriented bearing surface for the one-way bearing and a longitudinally oriented bearing surface for the thrust bearing. According to some aspects, the thrust race comprises a hollow cylindrical portion comprising the radially oriented bearing surface and a flange extending radially outwardly from the cylindrical portion, the flange comprising the longitudinally oriented bearing surface.

According to some aspects, the one-way bearing is configured to allow the thrust race and the spindle to rotate freely in a high-efficiency direction of the electric linear actuator. The spindle is configured to rotate within the thrust race as the motor rotates the spindle in an opposite, low-efficiency direction.

According to some aspects, the one-way bearing is located adjacent the proximal end of the spindle. According to some aspects, the one-way bearing is located between the proximal end of the spindle and the thrust bearing.

According to some aspects, the one-way bearing is a roller bearing having rollers with axes of rotation parallel to the longitudinal axis.

According to some aspects, the electric linear actuator further comprises a rod configured to couple the spindle nut to the second component and configured to extend and retract from the housing as the spindle nut travels along the spindle.

According to some aspects, the first component is a transom of a boat and the second component is a trim tab.

BRIEF DESCRIPTION OF THE DRAWINGS

The present disclosure is described with reference to the following Figures. The same numbers are used throughout the Figures to reference like features and like components.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless otherwise specified or limited, the phrases "at least one of A, B, and C," "one or more of A, B, and C," and the like, are meant to indicate A, or B, or C, or any combination of A, B, and/or C, including combinations with multiple instances of A, B, and/or C. Likewise, unless otherwise specified or limited, the terms "mounted," "connected," "linked," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings As used herein, unless otherwise limited or defined, discussion of particular directions is provided by example only, with regard to particular embodiments or relevant illustrations. For example, discussion of "top," "bottom," "front," "back," "left," "right," "lateral" or "longitudinal" features is generally intended as a description only of the orientation of such features relative to a reference frame of a particular example or illustration. Correspondingly, for example, a "top" feature may sometimes be disposed below a "bottom" feature (and so on), in some arrangements or embodiments. Additionally, use of the words "first," "second", "third," etc. is not intended to connote priority or importance, but merely to distinguish one of several similar elements from another.

Figure 1:
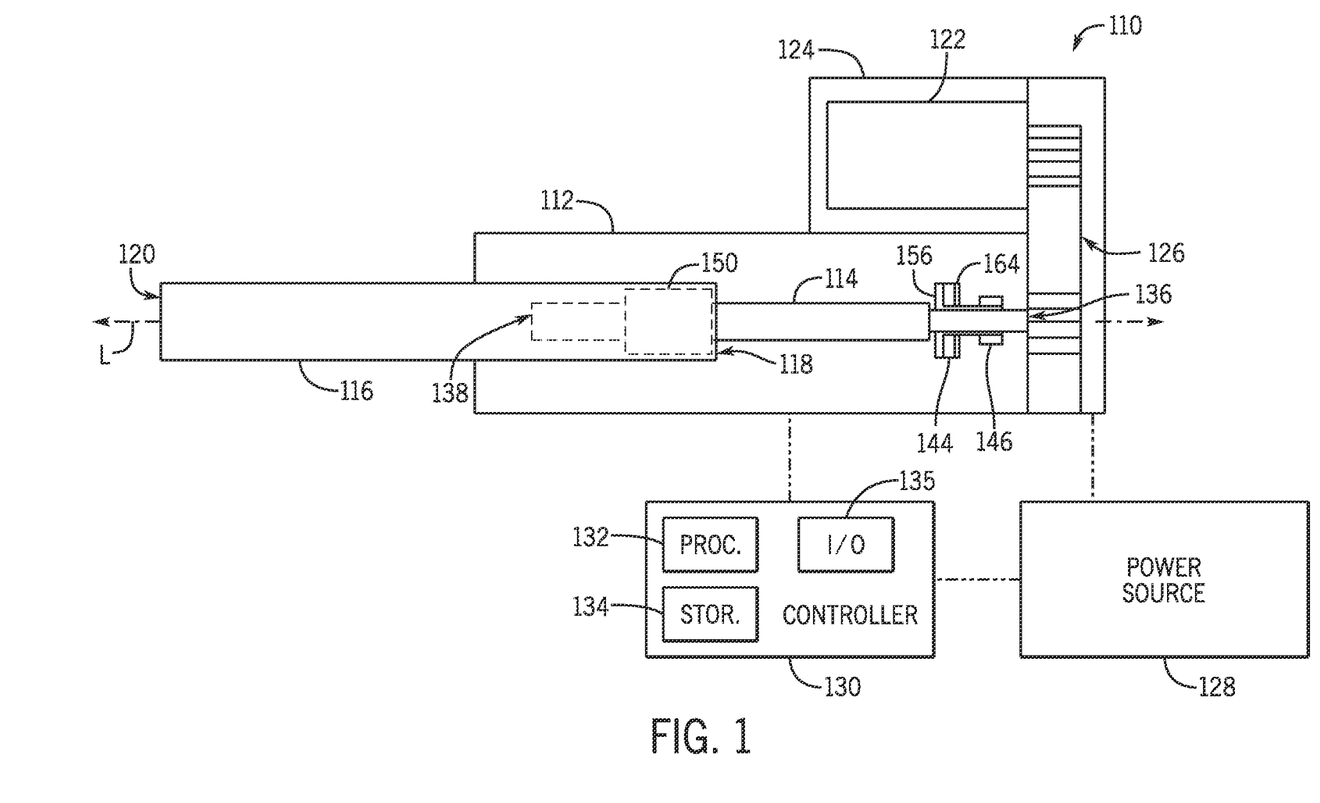
FIG. 1 is a schematic of one example of an electric linear actuator according to the present disclosure, in which a motor is geared to a spindle of the actuator.

FIG. 1 is a schematic of one example of the innerworkings of an electric linear actuator 110 according to one example of the present disclosure. The electric linear actuator 110 includes a housing 112, which extends along a longitudinal axis L. A spindle 114 is provided in the housing 112 and extends along the longitudinal axis L from a proximal end 136 to a distal end 138. A rod 116 is coaxially coupled to the spindle 114 by way of a spindle nut 150 (e.g., a ball nut, lead nut, acme nut, etc.). The rod 116 extends from a proximal end 118 located in the housing 112 to a distal end 120 located outside the housing 112. The rod 116 is movable along the longitudinal axis L in response to rotation of the spindle 114, due to the coupling between the rod 116 and the spindle 114 provided by the spindle nut 150.

A motor 122 is configured to rotate the spindle 114. The motor 122 is located in a motor housing 124 adjacent the housing 112. The output shaft of the motor 122 is coupled to the input shaft of the spindle 114 by way of a gear train 126. The motor 122 is provided with power from a power source 128, such as a battery. A controller 130 is configured to control the motor 122, such as by controlling the power provided to the motor 122 from the power source 128. In one example, the controller 130 controls the power to the motor 122 using pulse-width modulation. Note that although the controller 130 and power source 128 are shown as being connected to the housing 112 of the electric linear actuator 110, they are in fact connected to the electrical components inside the housings 112 and 124, and not every signal or power connection is shown herein.

The controller 130 includes a processing system 132, a storage system 134 accessible by the processing system 132, and an input/output (I/O) interface 135, which relays information to and from the processing system 132. The processing system 132 can comprise a microprocessor, including a control unit and a processing unit, and other circuitry, such as semiconductor hardware logic, that retrieves and executes software from the storage system 134. The storage system 134 can comprise any storage media readable by the processing system 132 and capable of storing software. The storage system 34 can include volatile and non-volatile, removable and non-removable media implemented in any method or technology for storage of information, such as computer-readable instructions, data structures, software modules, or other data. The processing system 132 loads and executes software from the storage system 134, such as software programmed with a rod positioning algorithm, which direct the processing system 132 to operate to move the rod 116 to a setpoint position. For example, the controller 130 can be programmed to activate the motor 122 with a given voltage and/or current for a given time in order to move the rod 116 from a present position to a setpoint position according to the rod positioning algorithm.

Figure 2:
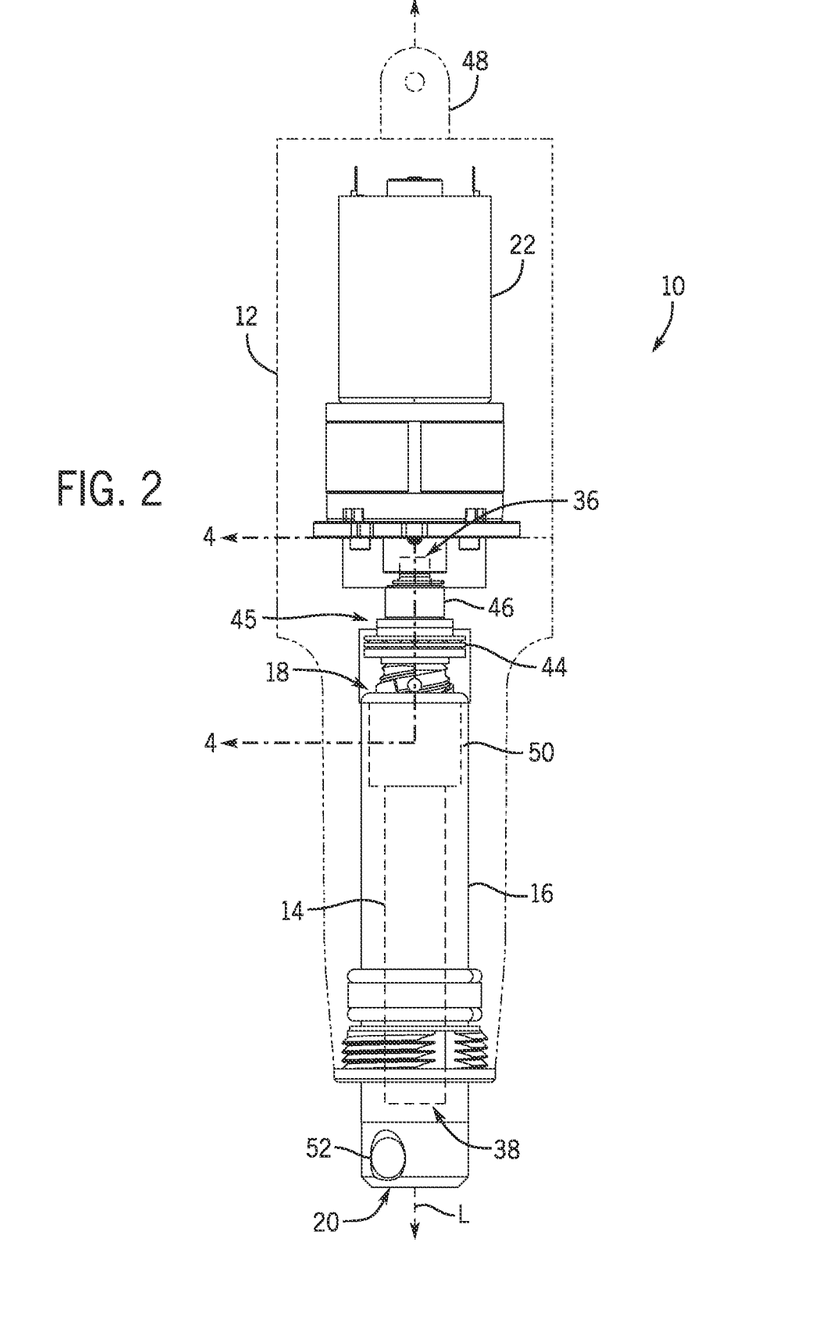
FIG. 2 illustrates another example of an electric linear actuator according to the present disclosure, in which a motor directly drives a spindle of the actuator.

FIG. 2 illustrates another example of an electric linear actuator 10, in which the motor 22 is in line with the longitudinal axis L along which the rod 16 travels. The electric linear actuator 10 includes a housing 12 extending along the longitudinal axis L. A spindle 14 is provided in the housing 12 and extends along the longitudinal axis L from a proximal end 36 to a distal end 38. The spindle 14 shown here is a ball screw, but it could instead be a lead screw, a planetary roller screw, or an acme screw. The motor 22 is coupled to the proximal end 36 of the spindle 14 and is configured to rotate the spindle 14. Such coupling could be made by way of a gear train or a direct-drive coupling. The motor 22 is a reversible motor that can rotate the spindle 14 in two opposite directions. A rod 16 is coaxially coupled to the spindle 14 and movable with respect to the housing 12 along the longitudinal axis L in response to rotation of the spindle 14. The rod 16 has a proximal end 18 and a distal end 20. Although not shown herein, the electric linear actuator 10 can be coupled to a controller and power source, which function as described hereinabove with respect to FIG. 1.

Figure 3:
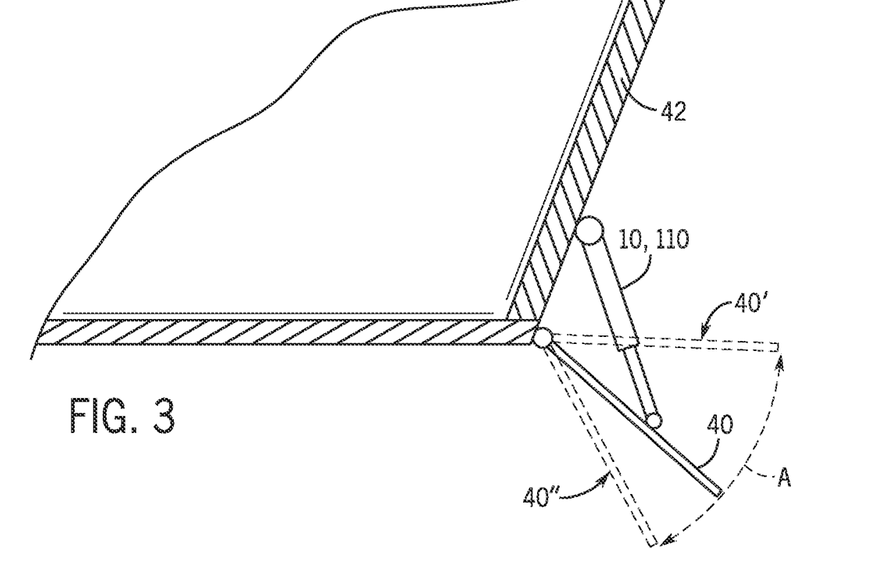
FIG. 3 illustrates a trim tab coupled to a transom of a boat by way of an electric linear actuator like that shown in FIG. 1 or FIG. 2.

The electric linear actuator 10 or 110 can be used to pivot a trim tab with respect to a transom of a boat. For example, referring to FIG. 3, a trim tab 40 and electric linear actuator 10, 110 are shown installed on the transom 42 of a boat. Another trim tab may be installed on the opposite side of the transom 42, which trim tab is aligned with the trim tab 40 and therefore hidden from view in FIG. 3. The electric linear actuator 10 or 110 (and thus the position of the trim tab 40) is controlled by the controller 130 in response to inputs to a user input device, which may be a button, switch, key, or touch-sensitive display screen with a virtual key. A user may input a "trim up" command via the user input device, in response to which the controller 130 provides power to the electric linear actuator 10 or 110 to retract the rod 16 or 116 into the housing 12 or 112 by rotating the spindle 14 or 114 in a first direction (e.g., clockwise). The trim tab 40 can be trimmed up to the maximum trimmed up position shown at 40'. The user may input a "trim down" command via the user input device, in response to which the controller 130 provides power to the actuator 10 or 110 to extend the rod 16 or 116 from the housing 12 or 112 by rotating the spindle 14 or 114 in an opposite, second direction (e.g., counterclockwise). The trim tab 40 can be trimmed down to the maximum trimmed down position shown at 40". The distal end of the trim tab 40 thus moves along the arc A as the rod 16 or 116 is extended from or retracted into the housing 12 or 112. Note that the example of clockwise rotation of the spindle for trimming up and counterclockwise rotation of the spindle for trimming down are exemplary only; depending on the design of the spindle and spindle nut, the opposite could be true.

Referring to both FIGS. 1 and 2, in order to increase the efficiency of the electric linear actuator 10, 110 when the rod 16, 116 is pushing against or pulling on a load, a thrust bearing 44, 144 is provided, which decreases the friction that the motor 22, 122 must overcome to rotate the spindle 14, 114 and thereby extend or retract the rod 16, 116 against a load. Through research and development, the present inventors have realized that such increased efficiency works both ways; that is, increased efficiency also makes it easier for the spindle 14, 114 to rotate in response to an external load being applied to the rod 16, 116 while the motor 22, 122 is not provided with power. Such rotation of the spindle 14, 114 as a result of an external applied load can back-drive the motor 22, 122, which is an undesired effect. In order to prevent such back-drive, the present inventors have provided a one-way bearing 46, 146 about the spindle 14, 114. The one-way bearing 46, 146 is configured to prevent back-drive of the motor 22, 122 when the spindle 14, 114 is subject to an external load via the rod 16, 116. The one-way bearing 46, 146 is a simpler and lower cost alternative to a spring-loaded electromagnetic brake and a more efficient alternative to a wrap-spring brake, both of which are typically used to prevent back-drive.

Although the electric linear actuator 110 of FIG. 1 is shown with the thrust bearing 144 and one-way bearing 146 provided as part of the assembly, only the assembly of FIG. 2 will be described in detail, it being understood that the thrust bearing 144 and one-way bearing 146 operate in a similar manner to the thrust bearing 44 and one-way bearing 46 described herein below. It does bear mention, however, that the one-way bearing 146 in the electric linear actuator 110 could be provided other than coaxially with the spindle 114 as shown herein, such as on a shaft in the gear train 126 or between the gear train 126 and the output shaft of the motor 122.

Figure 4:
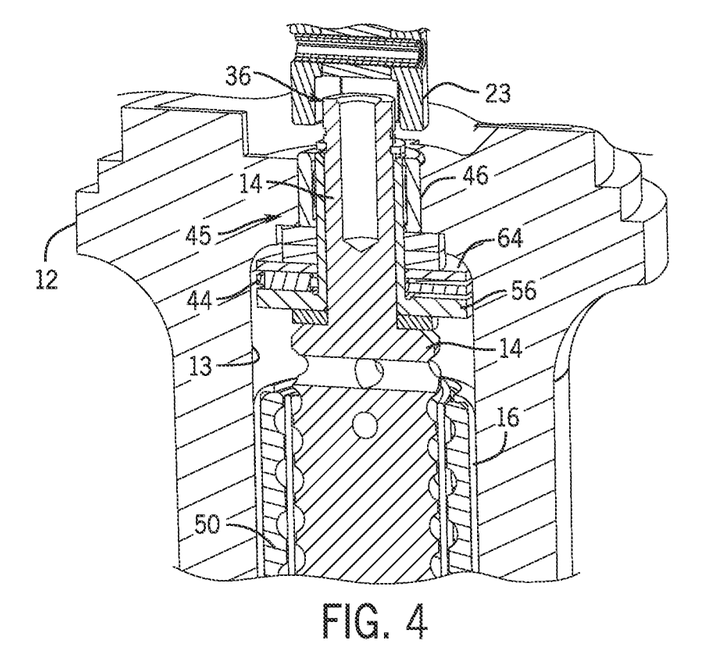
FIG. 4 is a cross-section of a portion of the electric linear actuator of FIG. 2, taken along the line 4-4.

FIG. 2 shows the electric linear actuator 10 with the housing 12 partially cut away to reveal the inner components, while FIG. 4 shows a cross-section taken along the line 4-4 in FIG. 2. The housing 12 is configured to be coupled to a first component, such as the transom 42 of a boat, by way of a clevis 48 and a mounting bracket (not shown). The spindle 14 is provided in the housing 12 and extends along the longitudinal axis L from a proximal end 36 to a distal end 38. The motor 22 is coupled to the proximal end 36 of the spindle 14, such as by way of a direct drive coupling 23, and is configured to rotate the spindle 14 when power is provided to the motor 22. The spindle nut 50 is received on the spindle 14 and movable with respect to the housing 12 along the longitudinal axis L in response to rotation of the spindle 14. The spindle nut 50 is configured to be coupled to a second component, such as a trim tab 40. More specifically, the rod 16 is configured to couple the spindle nut 50 to the second component (e.g., trim tab 40) by way of a clevis 52 and a mounting bracket (not shown). The spindle nut 50 is positioned between upper and lower shoulders formed within the rod 16 and thus the rod 16 is configured to extend and retract from the housing 12 as the spindle nut 50 travels along the spindle 14. Such extension and retraction of the spindle 14 moves the second component with respect to the first component, or vice versa. The one-way bearing 46 is configured to prevent back-drive of the motor 22 when an external load is applied to the second component (e.g., trim tab 40) while the motor 22 is not provided with electrical power.

Figure 5:
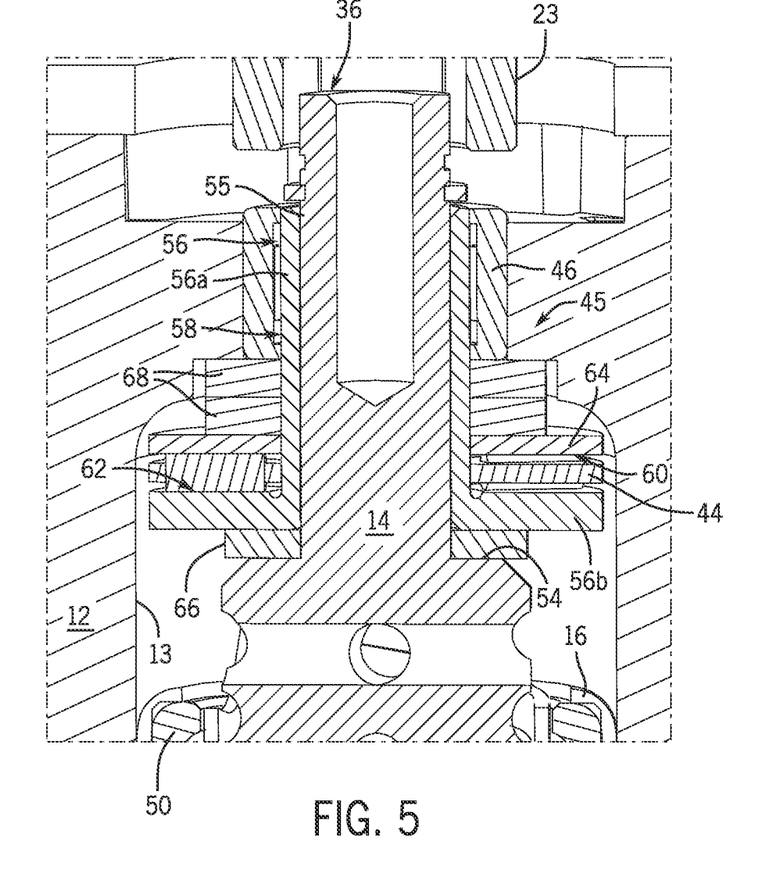
FIG. 5 is a more detailed view of a portion of FIG. 4.

FIG. 5 shows a close-up of the cross-sectional view of FIG. 4 and is referred to in order to describe the bearing assembly 45 of the electric linear actuator 10 in more detail. The bearing assembly 45 is situated within a bore 13 formed in the housing 12. It can be seen that the thrust bearing 44 is provided coaxially on the spindle 14, more specifically, on a lesser-diameter portion 55 of the spindle situated above the shoulder 54. The thrust bearing 44 is located between the proximal end 36 of the spindle 14 and the rod 16. In the example shown here, the one-way bearing 46 is located adjacent the proximal end 36 of the spindle 14. Specifically, the one-way bearing 46 is located between the proximal end 36 of the spindle 14 and the thrust bearing 44. In other examples, the one-way bearing can be provided elsewhere, for example, between the thrust bearing 44 and the shoulder 54 on the spindle 14 or proximate the distal end 38 of the spindle 14. In such alternative arrangements, the inner diameter of the bore 13 in the housing 12 would be decreased in order that the one-way bearing could be press fit therein.

Figure 6:
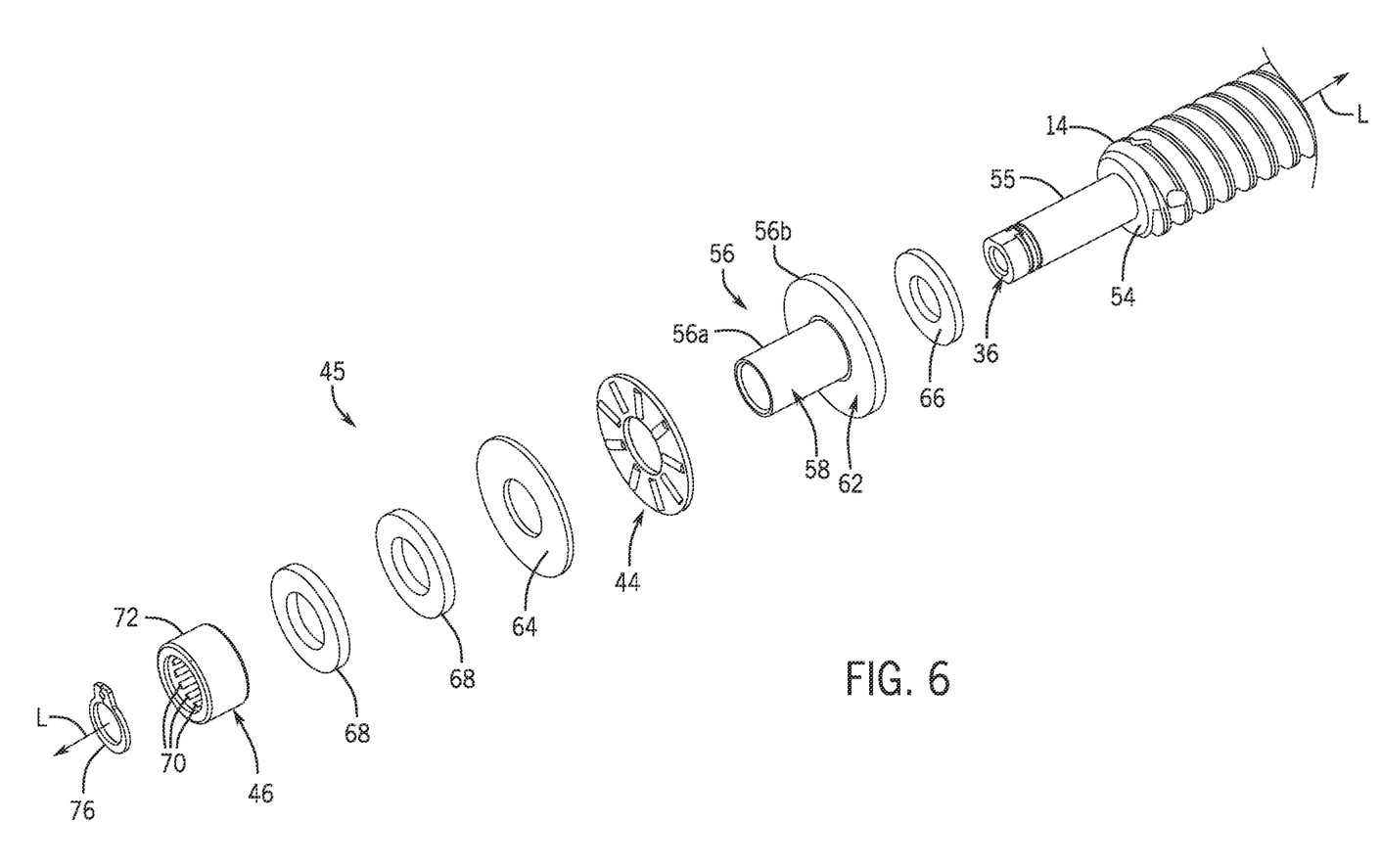
FIG. 6 is an exploded view of parts of the electric linear actuator of FIG. 2.

A thrust race 56 is provided coaxially on the spindle 14. Referring to FIGS. 5 and 6, the thrust race 56 comprises both a radially oriented bearing surface 58 for the one-way bearing 46 and a longitudinally oriented bearing surface 62 for the thrust bearing 44. The thrust race 56 comprises a hollow cylindrical portion 56a comprising the radially oriented bearing surface 58 and a flange 56b extending radially outwardly from the cylindrical portion 56a, the flange 56b comprising the longitudinally oriented bearing surface 62.

More generally, as is typical for a thrust bearing 44, the bearing assembly 45 provides for a first bearing surface 60 located on a proximal side of the thrust bearing 44 and a second bearing surface 62 located on a distal side of the thrust bearing 44. One of the first and second bearing surfaces 60, 62 (here, the second bearing surface 62) is provided on the thrust race 56, which is provided coaxially on the spindle 14. The other of the first and second bearing surfaces 60, 62 (here, the first bearing surface 60) is provided on a thrust washer 64. In another example, the thrust race 56 could be designed and located such that the flange 56b provides the bearing surface on the proximal side of the thrust bearing 44, while a thrust washer could be provided on the distal side of the thrust bearing 44. Typically, a thrust bearing will have a thrust washer on each side. In contrast, in the present example, one of the thrust washers is replaced by the flange 56b on the thrust race 56, which thrust race 56 also serves as an inner race for the one-way bearing 46. Specifically, the hollow cylindrical portion 56a serves as the inner race for the one-way bearing 46, and the flange 56b comprises the one of the first and second bearing surfaces for the thrust bearing 44.

FIG. 6 is an exploded view of the spindle 14 and the bearing assembly 45 provided on the lesser-diameter portion 55 of the spindle 14. A washer 66 is provided immediately adjacent the shoulder 54 on the spindle 14. The thrust race 56 is provided adjacent the washer 66, with the cylindrical portion 56a facing away from the washer 66. The thrust bearing 44 is next provided over the cylindrical portion 56a of the thrust race 56 and adjacent the bearing surface 62 on the flange 56b. The thrust washer 64 is provided on the opposite side of the thrust bearing 44 from the flange 56b. Two optional spacers 68 are then provided over the cylindrical portion 56a of the thrust race 56. The spacers 68 may be needed for retrofit applications, in which the housing 12 is not of the appropriate dimension to hold the stacked components of the bearing assembly 45. The one-way bearing 46 is next provided over the cylindrical portion 56a of the thrust race 56. Note that the one-way bearing 46 does not have an inner race, so the rollers 70 can be seen in the outer race 72. The bearing surface 58 on the cylindrical portion 56a of the thrust race 56 instead serves as the inner race, against which the rollers 70 rotate. Finally, a retaining ring 76 is provided on the lesser-diameter portion 55 of the spindle 14.

Note that in the present example, the one-way bearing 46 is a roller bearing having rollers 70 with axes of rotation parallel to the longitudinal axis L. However, in other examples, the rollers could be radially oriented perpendicular to the longitudinal axis L (as with the rollers of the thrust bearing 44) and one of the upper and lower races of the one-way bearing could be keyed to the thrust race 56, while the other of the upper and lower races could be keyed to the inside of the housing 12.

Figure 7:
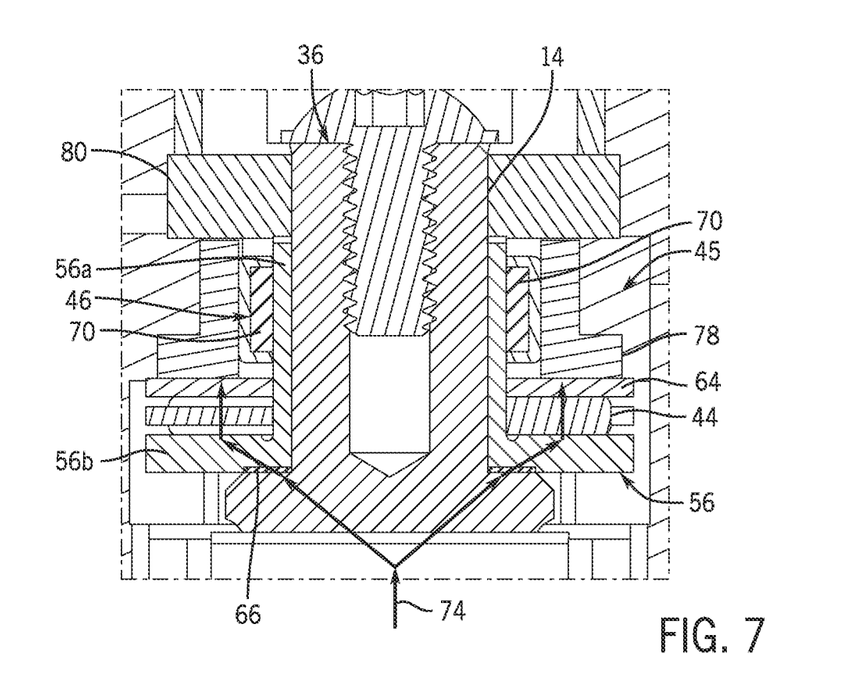
FIG. 7 is a schematic showing how parts of the electric linear actuator interact when power is provided to the motor to drive the spindle and a compressive load is applied to a rod coupled to the spindle.
Figure 8:
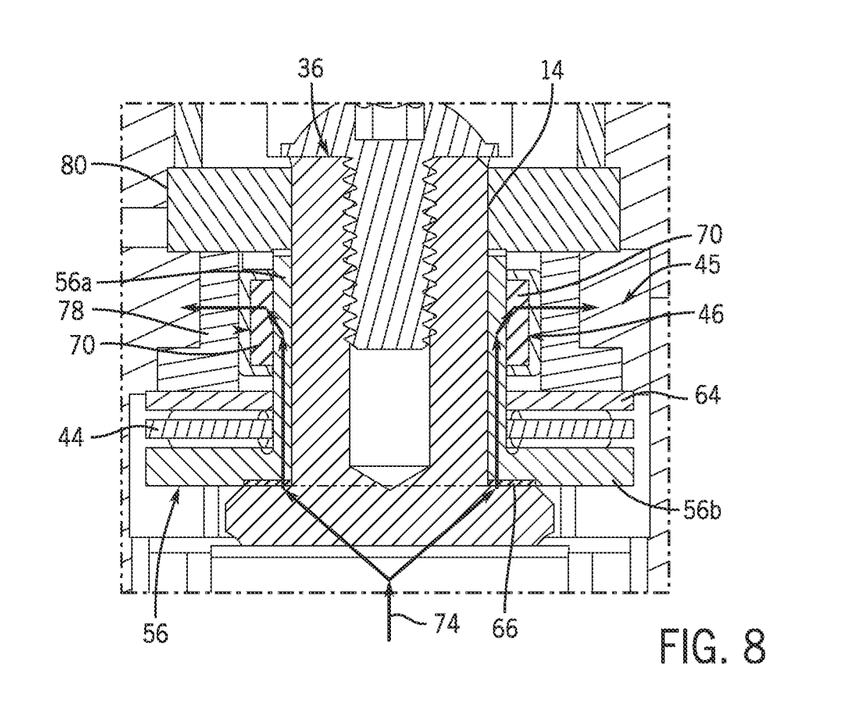
FIG. 8 is a schematic showing how parts of the electric linear actuator interact when the motor is no longer provided with power and a compressive load is applied to the rod.

FIG. 7 shows the bearing assembly 45 in a case in which the rollers 70 of the one-way bearing 46 rotate freely and allow rotation of the thrust race 56 and spindle 14, while FIG. 8 shows the bearing assembly 45 in a case in which the spindle 14 is rotated in such a way that the rollers 70 of the one-way bearing 46 are locked. FIGS. 7 and 8 also show how an optional bushing 78 can be provided to serve as a housing for the one-way bearing 46, as well as how the spindle 14 can be driven by the last gear 80 in a gear train, in the event the spindle 14 is not directly driven by the motor 22.

In FIG. 7, the motor 22 is rotating the spindle 14 in a direction in which the rollers 70 of the one-way bearing 46 rotate freely. In this example, such rotation of the spindle 14 results in the rod 16 extending from the housing 12; however, in cases where the electric linear actuator 10 is typically used to retract the rod 16 into the housing 12 against a load, the one-way bearing may allow free rotation of the spindle in a direction tending to retract the rod. As the spindle 14 rotates, the thrust race 56 also rotates due to friction between the outer circumferential surface of the spindle 14 and the inner circumferential surface of the cylindrical portion 56a of the thrust race 56. The thrust race 56 rotates efficiently due to the thrust bearing 44 being adjacent the flange 56b of the thrust race 56. The thrust bearing 44 effectively lessens the friction against which the thrust race 56 (and therefore spindle 14) would otherwise have to work. The spindle 14 therefore rotates efficiently, in this example, to extend the rod 16 from the housing 12.

A load may be applied in a direction opposite the direction of extension of the rod 16. This is typically the case for a trim tab actuator, the motor of which must be able to extend or hold the rod 16 against loads as high as 750 pounds as the boat bounces and the trim tab slams into the water, or more typically around 300 pounds of sustained load at cruising. This compressive load is shown at 74 in FIG. 7. Because the one-way bearing 46 is not locked, the load transmitted from the rod 16 to the spindle 14 is thereafter transmitted through friction by way of the washer 66 into the thrust race 56, then the thrust bearing 44, then the thrust washer 64, and from there into the housing 12. If the thrust bearing 44 were not present, such compression loading would tend to increase friction and might make it difficult for the motor 22 to rotate the spindle 14. However, the thrust bearing 44 reduces the friction, allowing the electric linear actuator 10 to operate at high efficiency to extend the rod 16.

Referring now to FIG. 8, if power is no longer provided to the motor 22 (e.g., power is lost or the trim system is turned off), there is no longer a torque applied to the spindle 14. The compressive load 74 on the rod 16 will tend to rotate the spindle 14 in the absence of the counteracting torque applied by the motor 22. The load on the spindle 14 will be transmitted through friction via the washer 66 to the thrust race 56. However, the one-way bearing 46 prevents the thrust race 56 from rotating with the spindle 14. The load is therefore transmitted from the thrust race 56 to the locked one-way bearing 46 and into the housing 12, not into the motor 22. Thus, the motor 22 is prevented from being back-driven when a compressive load 74 is applied to the rod 16 and the motor 22 is without power.

Note that the motor 22 can still drive the spindle 14 to retract the rod 16 into the housing 12 despite the inclusion of the one-way bearing 46. The motor 22 applies enough torque to rotate the spindle 14 within the cylindrical portion 56a of the thrust race 56. In other words, the motor's torque is enough to overcome the friction between the outer circumferential surface of the spindle 14 and the inner circumferential surface of the thrust race 56 such that the former can rotate within the latter. Thus, the spindle 14 is configured to rotate within the thrust race 56 as the motor 22 rotates the spindle 14 in a direction that retracts the rod 16 into the housing 12.

Those having ordinary skill in the art will understand that not all electric linear actuators are intended to push against an external compressive load, i.e., some actuators are intended to pull against an external tensile load. Thus, more generally, the one-way bearing 46 is configured to allow the thrust race 56 and the spindle 14 to rotate freely in a high-efficiency direction of the electric linear actuator 10, i.e., as the spindle 14 rotates in a direction tending to extend the rod 16 against an external compressive load or to retract the rod 16 against an external tensile load. The spindle 14 is configured to rotate within the thrust race 56 as the motor 22 rotates the spindle 14 in an opposite, low-efficiency direction, i.e., as the motor 22 rotates the spindle 14 to retract a rod that typically works against an external compressive load or to extend a rod that typically works against an external tensile load. Thus, the bearing assembly 45 provides high efficiency in one direction (extension or retraction) of the rod 16 and low efficiency in the opposite direction of the rod 16, while also preventing back-drive of the motor 22 when the motor 22 is not provided with power. In the example in which the electric linear actuator 10 is used to pivot a trim tab 40, high rotational efficiency is desirable in the direction of extension of the rod 16, as the motor 22 is working against an external compressive load, while low efficiency in the direction of retraction of the rod 16 is sufficient, as the compressive load acts in the direction of retraction.

The load that the one-way bearing 46, 146 needs to be able to handle is dependent upon not only the torque that is expected to act on the spindle 14, 114 when an external load is applied to the rod 16, 116, but also on the type and design of the spindle 14, 114. For instance, if a ball screw is used, the one-way bearing will likely need to be able to handle a higher load than if an acme screw were used, all else being equal. A ball screw with a larger lead angle (and therefore higher efficiency) would likely need to be paired with a one-way bearing that can handle greater loads, while a ball screw with a smaller lead angle could be paired with a one-way bearing that can handle lesser loads, all else being equal. Friction within the assembly will also play a part in selection of the one-way bearing 46, 146. For instance, a lead screw has higher drag torque—and therefore lower efficiency—than a ball screw, and thus may be able to be paired with a one-way bearing that can handle less load, all else being equal.

Although thrust bearing 44 shown herein is a roller bearing, it could instead be a tapered roller bearing or a ball bearing. The one-way bearing 46 could be a one-way needle roller bearing as shown herein, or could instead be a sprague clutch bearing or ball bearing.

Although the electric linear actuators 10, 110 shown and described herein are rod-type actuators, a one-way bearing and thrust bearing located in the same or a similar location within a track-type actuator would function in the same way to prevent loads applied to the spindle nut via the track from back-driving the motor when the motor is not provided with power.

In the above description, certain terms have been used for brevity, clarity, and understanding. No unnecessary limitations are to be inferred therefrom beyond the requirement of the prior art because such terms are used for descriptive purposes and are intended to be broadly construed. The order of method steps or decisions shown in the Figures and described herein are not limiting on the appended claims unless logic would dictate otherwise. It should be understood that the decisions and steps can be undertaken in any logical order and/or simultaneously. The different systems and methods described herein may be used alone or in combination with other systems and methods. It is to be expected that various equivalents, alternatives and modifications are possible within the scope of the appended claims.

What is claimed is:

1. An electric linear actuator comprising:
   a housing extending along a longitudinal axis;
   a spindle provided in the housing and extending along the longitudinal axis from a proximal end to a distal end;
   a motor coupled to the proximal end of the spindle and configured to rotate the spindle;
   a rod coaxially coupled to the spindle and movable with respect to the housing along the longitudinal axis in response to rotation of the spindle;
   a direct drive coupling configured to couple the proximal end of the spindle to an output shaft of the motor;
   a thrust bearing provided coaxially on the spindle, wherein the thrust bearing is located between the proximal end of the spindle and the rod; and
   a one-way bearing provided coaxially on the spindle and configured to prevent back-drive of the motor when the spindle is subject to an external load via the rod,
   wherein the one-way bearing is located adjacent the proximal end of the spindle between the proximal end of the spindle and the thrust bearing, and between the direct drive coupling and the thrust bearing, and
   wherein the one-way bearing comprises:
      a first side; and
      a second side;
      wherein the one-way bearing is configured to:
         facilitate free rotation between a first bearing surface located on the first side and a second bearing surface located on the second side in a first direction; and
         inhibit rotation between the first bearing surface and the second bearing surface in a second direction opposite the first direction;
   wherein the one-way bearing is located within the housing such that one of the first and second sides is inhibited from rotating within the housing via a coupling to an inside of the housing, and the other of the first and second sides is coupled to the spindle, thereby facilitating rotation of the spindle in the first direction, and inhibiting rotation of the spindle in the second direction while the motor is not provided with electrical power.

2. The electric linear actuator of claim 1, further comprising a third bearing surface located on a proximal side of the thrust bearing and a fourth bearing surface located on a distal side of the thrust bearing.

3. The electric linear actuator of claim 2, wherein one of the third and fourth bearing surfaces is provided on a thrust race that is provided coaxially on the spindle, and the other of the third and fourth bearing surfaces is provided on a thrust washer.

4. The electric linear actuator of claim 1, wherein one of the first and second bearing surfaces is provided on a thrust race that is provided coaxially on the spindle; and
   wherein the thrust race also serves as an inner race for the one-way bearing.

5. The electric linear actuator of claim 4, wherein the spindle is configured to rotate within the thrust race as the motor rotates the spindle in the second direction.

6. The electric linear actuator of claim 4, wherein the thrust race comprises a hollow cylindrical portion serving as the inner race for the one-way bearing and a flange extending radially outwardly from the cylindrical portion, the flange comprising a bearing surface for the thrust bearing.

7. The electric linear actuator of claim 1, wherein the one-way bearing is a roller bearing having rollers with axes of rotation parallel to the longitudinal axis.

8. The electric linear actuator of claim 1, further comprising:
   a thrust race provided coaxially on the spindle, the thrust race comprising:
      a hollow cylindrical portion; and
      a flange extending radially outward from the cylindrical portion,
   wherein the thrust race comprises both a radially oriented bearing surface for the one-way bearing and a longitudinally oriented bearing surface for the thrust bearing.

9. The electric linear actuator claim 8, wherein the hollow cylindrical portion comprises the radially oriented bearing surface and the flange comprises the longitudinally oriented bearing surface.

10. The electric linear actuator of claim 1, further comprising:
    a thrust race provided coaxially on the spindle, wherein the thrust race serves as an inner race of the one-way bearing, thereby providing one of the one of the first and second bearing surfaces, wherein the spindle is configured to rotate within the thrust race in the second direction as the motor rotates the spindle in the second direction, and wherein the one-way bearing is configured to inhibit rotation of the thrust race in the second direction as the motor rotates the spindle in the second direction, thereby facilitating rotation of the spindle in the second direction with respect to the thrust race and the housing.

11. An electric linear actuator comprising:
a housing extending along a longitudinal axis, the housing configured to be coupled to a first component;
a spindle provided in the housing and extending along the longitudinal axis from a proximal end to a distal end;
a motor coupled to the proximal end of the spindle and configured to rotate the spindle;
a spindle nut received on the spindle and movable with respect to the housing along the longitudinal axis in response to rotation of the spindle, the spindle nut configured to be coupled to a second component;
a thrust race provided coaxially on the spindle, the thrust race comprising:
  a hollow cylindrical portion; and
  a flange extending radially outward from the cylindrical portion;
a one-way bearing configured to prevent back-drive of the motor when an external load is applied to the second component while the motor is not provided with electrical power,
  wherein the one-way bearing is provided coaxially to the spindle and the thrust race, and is located between the hollow cylindrical portion of the thrust race and the housing; and
a thrust bearing provided coaxially on the spindle,
  wherein the thrust race comprises both a radially oriented bearing surface for the one-way bearing and a longitudinally oriented bearing surface for the thrust bearing.

12. The electric linear actuator of claim 11, wherein the hollow cylindrical portion comprises the radially oriented bearing surface and the flange comprises the longitudinally oriented bearing surface.

13. The electric linear actuator of claim 11, wherein the one-way bearing is configured to allow the thrust race and the spindle to rotate freely in a high-efficiency direction of the electric linear actuator configured to actuate the electric linear actuator in a first linear direction, such that the thrust race and spindle both rotate in the high efficiency direction during actuation of the electric linear actuator in the first linear direction; and wherein the spindle is configured to rotate within the thrust race as the motor rotates the spindle in an opposite, low-efficiency direction configured to actuate the electric linear actuator in a second linear direction, such that the spindle rotates within the thrust race in the low-efficiency direction while the thrust race is inhibited from rotating in the low-efficiency direction with respect to the housing during actuation of the electric linear actuator in the second linear direction.

14. The electric linear actuator of claim 11, wherein the spindle is coupled to the motor via a mechanical coupling member provided coaxially adjacent the proximal end of the spindle; and
  wherein the one-way bearing is located adjacent the proximal end of the spindle, and between the mechanical coupling member and the spindle nut.

15. The electric linear actuator of claim 14, wherein the one-way bearing is located between the proximal end of the spindle and the thrust bearing.

16. The electric linear actuator of claim 11, wherein the one-way bearing is a roller bearing having rollers with axes of rotation parallel to the longitudinal axis.

17. The electric linear actuator of claim 11, further comprising a rod configured to couple the spindle nut to the second component and configured to extend and retract from the housing as the spindle nut travels along the spindle.

18. The electric linear actuator of claim 11, wherein the one-way bearing comprises an outer race;
  wherein an outer surface of the hollow cylindrical portion serves as an inner race for the one-way bearing; and
  wherein the outer race is adjacent to, and in contact with, a portion of the housing.

19. The electric linear actuator of claim 11, further comprising:
  a direct drive coupling configured to couple the proximal end of the spindle to an output shaft of the motor,
    wherein the one-way bearing is located adjacent the proximal end of the spindle between the proximal end of the spindle and the thrust bearing, and between the direct drive coupling and the thrust bearing.

20. The electric linear actuator of claim 11, further comprising:
  a bushing located between the housing and the one-way bearing,
    wherein the bushing serves as a housing for the one-way bearing; and
  a gear provided coaxially on the spindle, and comprising a portion of a gear chain coupling configured to couple the proximal end of the spindle to the motor.

* * * * *